United States Patent [19]

Östman et al.

[11] Patent Number: 5,778,027
[45] Date of Patent: Jul. 7, 1998

[54] METHOD AND APPARATUS FOR DETERMINING SIGNAL COMPONENTS USING DIGITAL SIGNAL PROCESSING

[75] Inventors: Thomas Östman, Spånga; Anders Engman, Stockholm, both of Sweden

[73] Assignee: Telefonaktiebolaget LM Ericsson, Stockholm, Sweden

[21] Appl. No.: 562,464

[22] Filed: Nov. 24, 1995

[51] Int. Cl.$^6$ ............................................. H04L 27/36
[52] U.S. Cl. .............................. 375/298; 375/305
[58] Field of Search ........................ 375/298, 305; 370/530, 525

[56] References Cited

U.S. PATENT DOCUMENTS

| | | | |
|---|---|---|---|
| 4,648,098 | 3/1987 | Kerr | 375/47 |
| 4,686,688 | 8/1987 | Chung et al. | 375/47 |
| 5,022,054 | 6/1991 | Wang | 375/64 |
| 5,216,391 | 6/1993 | Shiraishi et al. | 332/101 |
| 5,255,288 | 10/1993 | Ichihara | 375/64 |
| 5,420,887 | 5/1995 | Rhodes et al. | 375/295 |
| 5,627,499 | 5/1997 | Gardner | 332/101 |
| 5,648,982 | 7/1997 | Durrant et al. | 375/206 |

FOREIGN PATENT DOCUMENTS

| | | |
|---|---|---|
| 2270447 | 3/1994 | United Kingdom . |
| WO91/19360 | 12/1991 | WIPO . |

OTHER PUBLICATIONS

European Standard Search Report No. RS 96059 Date of Completion of Search: 12 Jun. 1996.

"Putting DDS to Work", Hickman, Electronics World and Wireless World, vol. 98, No. 1679, pp. 937–941 (Nov. 1992).

Primary Examiner—Stephen Chin
Assistant Examiner—Mohammad Ghayour
Attorney, Agent, or Firm—Burns, Doane, Swecker & Mathis, L.L.P.

[57] ABSTRACT

Methods and systems for determining a cosine (I) or sine (Q) component for the purpose of modulating a digital signal in radiocommunication systems are disclosed. Exemplary embodiments describe how such determinations may be performed using digital signal processing techniques to improve component accuracy, while reducing the amount of processor memory (e.g., DSP memory) used to accomplish this task. Phase information from a sampled signal is used to access one or more tables containing component values, or a combination of a component base values and difference values between consecutive base values. The phase information can be used derive an offset value from the difference values, which offset value is added to a component base value to provide a component value for output. This has the effect of reducing the amount of memory consumed while maintaining high resolution.

16 Claims, 8 Drawing Sheets

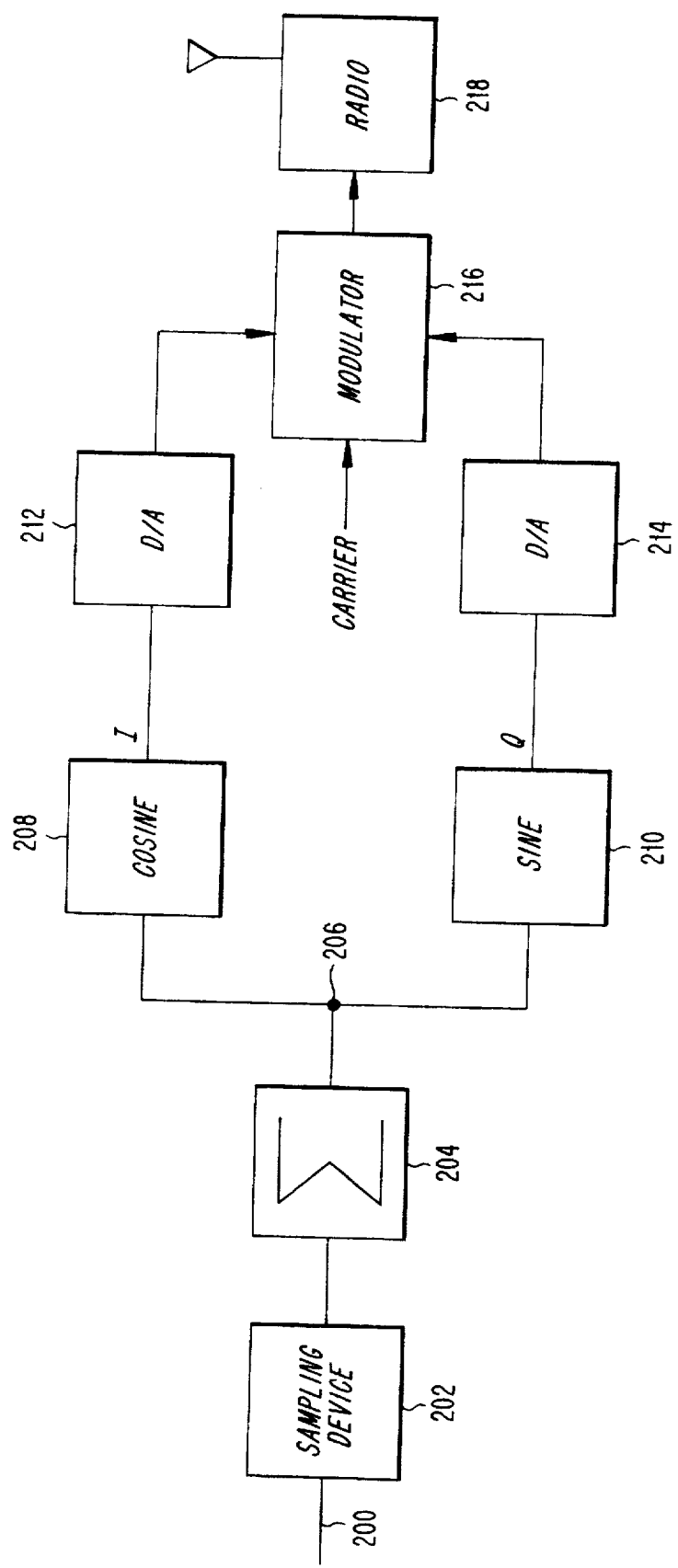

METHOD AND APPARATUS FOR DETERMINING SIGNAL COMPONENTS USING DIGITAL SIGNAL PROCESSING

BACKGROUND

The present invention is directed generally to radiocommunication systems and, more particularly, to techniques for determining sine and cosine values to facilitate modulation of a signal for radio transmission.

The first cellular mobile radio systems utilized analog systems to process and convey speech and other analog information. These systems comprised multiple radio channels for transmitting analog information between base and mobile stations by transmitting analog-modulated radio signals. In general, the signal handling processes in such systems were performed by analog hardware in the base and mobile stations.

Recently, digital cellular mobile radio systems for public use have been designed. Digital cellular mobile radio systems utilize digital signal processing and digital radio channels for handling digital or digitized analog information transmitted between base and mobile stations. Digital cellular mobile radio systems may offer substantial advantages, e.g., increased system capacity, reduced component size and enhanced signal processing capability, over analog cellular mobile radio systems. To achieve these advantages there are certain demands on the digital signal processing. In particular, signal handling processes need to be performed rapidly and frequently relative to conventional analog systems.

In contrast to the introduction of digital-only cellular mobile radio systems, in areas with existing analog cellular systems it has been proposed to introduce digital cellular mobile radio systems which are designed to accommodate existing analog cellular mobile radio systems. In this way, large legacy customer bases will not suddenly find that their analog terminal equipment has become obsolete. System designers of these hybrid systems believe that the digital portion of the system can be gradually introduced and, over time, the number of digital channels can be gradually increased, while the number of analog channels is gradually decreased. In order to provide complete compatibility, such dual-mode systems should comport with both analog and digital standards that have been adopted. Because a large number of analog mobile stations remain in use, digital base stations must be able to support communication with those analog units as well as new digital units.

In an analog cellular system, information (source signals), can be conveyed in the form of frequency modulated (FM) modulated signals. An FM modulator encodes the analog source signals onto a carrier signal to generate a modulated signal. The modulated signal is then transmitted. A conventional FM modulator is depicted in FIG. 1. An analog source signal 100 is provided to an input port of a mixer 102. A carrier signal 105, generated by a voltage controlled oscillator (VCO) 104, is provided to a second input port of the mixer 102. The VCO can be tuned to a frequency associated with a channel that has been allocated for a particular transmission. The output of the mixer 102 is a modulated signal 106 having a frequency of the carrier signal 105 and containing the information in the source signal 100. The modulated signal 106 is transmitted by a radio 108.

Frequency modulation was adopted to overcome shortcomings inherent in amplitude modulated (AM) radio systems. AM signals carry information in the form of amplitude variations. However, such a modulation scheme is inherently susceptible to noise, fade and interference problems. FM systems also can be susceptible to the noise, fade and interference problems associated with amplitude variations in the modulated FM signal. One way to FM modulate signals prior to transmission is to separate the signals into their sine (Q) and cosine (I) components, modulate each component onto an intermediate frequency signal and use the intermediate frequency signals to modulate a carrier signal.

With the increased power of digital signal processors (DSPs), system designers are interested in implementing many signal processing techniques, which were previously implemented using analog hardware components, as DSP routines. These techniques include source signal modulation. DSP implementation has the added attraction of reducing the number of components, and hence the size, of the base stations and mobile stations. Of course, digital signal processing also has its limitations. One design tradeoff which system designers confront when trying to implement analog signal processing techniques as DSP routines is that of task execution speed versus the amount of DSP resources which are available to execute the task. The availability of DSP resources can be measured in terms of the number of millions of instructions per second (MIPS) available to execute a given task. Since digital signal processors are not yet sufficiently fast or inexpensive that their use for executing routines is insignificant, system designers are called upon to develop innovative digital signal processing techniques, and efficient methods of utilizing digital signal processors. Memory is another DSP resource that must be proficiently managed. As a result of the constraints involved with digital signal processing and the utilization of digital signal processors, designers must devise techniques and methods to quickly effectively perform the tasks previously performed by analog systems, while conserving processing resources so that the digital signal processor can handle as many tasks as possible in a cost effective manner.

Conventional methods and apparatuses for determining sine and cosine components in a DSP environment might involve, for example, performing polynomial expansions to obtain values for these components. However, the calculations required to carry out such a solution can be prohibitive in terms of MIPS costs. This is especially true when quadrature component resolution requirements are high. Such resolution levels may necessitate the use of double precision processing which extracts an especially high cost in MIPS. Hence, conventional solutions, such as various component calculation techniques, are unacceptable.

SUMMARY

Limitations and constraints inherent in conventional methods and systems for utilizing digital signal processing to determine for example, sine and cosine components of a source signal, are overcome according to the present invention. Exemplary embodiments describe how such determinations may be performed using digital signal processing techniques in a fashion that conserves DSP memory, while providing high resolution sine and cosine components. Systems and methods in accordance with the present invention can be applied in, for example, cellular base and mobile stations.

Apparatuses and methods in accordance with a first exemplary embodiment of the present invention utilize phase data extracted from a source signal to access phase component information stored in memory. The phase data can be used as an address to point to an entry in a lookup table that contains corresponding sine or cosine component values. Values derived from the table can be provided for modulation and transmission purposes. The degree of sine and cosine component resolution is dictated by the number of table entries available. The greater the number of table entries, the smaller the increment between consecutive entries, and hence the greater the resolution.

In accordance with a second exemplary embodiment of the present invention, a sinusoidal component value can be produced by adding an offset value to a base value component. This can be achieved by organizing phase data extracted from a source signal in a two-part format. A first part is used to access one or more tables that contain phase component base values. A second part is an offset factor used to calculate an offset value that is added to a phase component base value derived from the tables. The tables, in accordance with this exemplary embodiment, contain both base values of the phase components and difference values. The difference values are simply differences between consecutive base component values. The difference values are used in conjunction with the offset factor to produce the offset value. The offset value is then added to a base component value to generate a quadrature component value that is output for modulation and transmission purposes.

Organizing the source phase data in accordance with the two-part format can reduce the number of values that must be stored in memory. However, since fewer (relatively low resolution) values are stored according to this embodiment, the actual component value will likely fall between two base values stored in a table. The offset value, in part, provides the difference between the base and an actual component value. The offset factor represents a degree, or percentage, that the desired component value is above the corresponding base value determined by the first part of the phase data. An offset value is determined by multiplying the offset factor with a difference value obtained from a table using the first part of the phase data.

The tables in accordance with the second embodiment can be considerably smaller than those required for the first embodiment. Consequently, less memory is required for the second embodiment. Moreover, the two-part technique can enhance resolution by dedicating more of the available phase data to calculating a high resolution offset value. This added resolution is achieved at the cost of a few additional instruction cycles, but without consuming additional memory. By using more phase data, the sine and cosine component values have higher resolution, and thus a lower error margin, compared to component values produced by using the large tables associated with the first embodiment. This provides enhanced system performance which can be recognized, for example, by reduced adjacent channel interference in transmitted signals.

BRIEF DESCRIPTION OF THE DRAWINGS

The foregoing, and other, objects, features and advantages of the present invention will be more readily understood upon reading the following detailed description in conjunction with the drawings in which:

FIG. 2 depicts a digital signal processing arrangement according to the present invention for extracting quadrature components from a signal;

DETAILED DESCRIPTION

Figure 1:
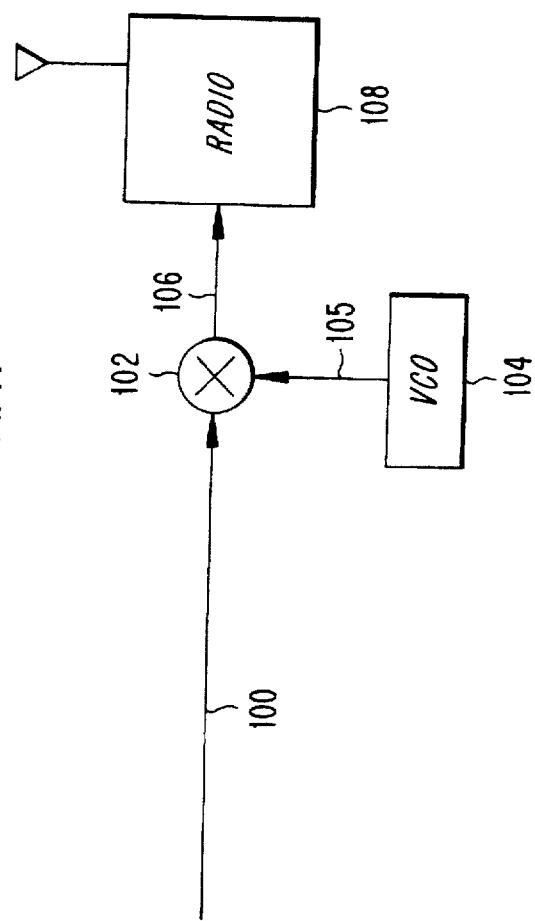
FIG. 1 depicts a conventional analog arrangement for FM modulation of a source signal.

In accordance with systems incorporating embodiments of the present invention, the task of FM modulating signal for output involves several additional steps as compared with the example given above.

In a digital signal processing environment in accordance with the invention, an analog source signal is first sampled. The sampling process typically involves a conversion of the source signal, or source signal samples, into a digital format. The samples are summed to determine phase angle information. In accordance with a first exemplary embodiment of the invention, this phase data is used to address lookup tables that contain cosine and sine (sometimes referred to as in-phase (I) and quadrature (Q)) component values. The samples contain a sufficient amount of phase information (i.e., a sequence of bits) from which to derive high resolution cosine and sine components. For instance, there may be 16 bits of useful (i.e., reliable) phase data in each sample. Using lookup tables to take advantage of this information would entail maintaining approximately ($2^{16}$) or 65,536 table entries. Such tables, spanning 65,536 incremental (I or Q) component values, would provide high resolution components. However, the tables would also consume a large amount of valuable processor memory.

Because of the limited amount of DSP memory typically available, a first solution is to compromise by balancing the resolution desired, or necessary, with the amount of DSP memory that is available. Consequently, shorter tables can be used which tables are addressed with only that amount of phase data necessary to achieve a desired resolution level. Though the source signal samples contain additional phase information, this information is disregarded, at the expense of component resolution, to conserve memory. Even though the tables are smaller than necessary to provide a highest achievable component accuracy, sufficiently lengthy tables are provided to achieve at least a minimum component resolution.

In accordance with a second exemplary embodiment of the invention, phase data from the source signal is broken up into a two-part format. A first part of the phase data is used to access component values in one or more short tables. A second part of the phase data is used for calculation of an offset value that is added to the component value derived from the table. Systems incorporating the invention according to the second exemplary embodiment allow for use of a greater amount of available phase data, and hence provide higher resolution, while requiring less memory. In a preferred embodiment, the addition of the base component value and the offset value is carried out using twos-complement arithmetic.

A block diagram of an exemplary system for performing FM modulation of a signal using digital signal processing is depicted in FIG. 2. In the figure, an incoming analog signal 200 is sampled and digitized by a sampling device 202. The sampling rate will depend upon various design considerations. In signals having information conveyed by a phase component of the signal, an incoming signal 200 can be sampled at a rate of, for example, 80 ksamples/second. A summation device 204 accumulates the digitized samples generated by the sampling device 202. In accordance with the exemplary DSP architecture described herein, each sample contains 16-bits of information. As part of the phase data extraction process, the samples from the sampling device 202 are typically upsampled at a higher rate, for example, 240 ksamples/second, by the summation device 204. As will be appreciated by those skilled in the art, upsampling at this rate provides two additional samples for original sample. The upsampling process condenses the samples from the sampling device 202 and facilitates a filtering operation (not shown) used to smooth output generated by the summation device 204. For the purpose of illustration, the output from the summation device 204 is depicted as being provided to a node 206 which sends the summation device output to cosine and sine component generators 208 and 210. Cosine and sine generators 208 and 210 can, for example, be implemented as DSP routines which access look-up tables as described below.

Sample information provided by the summation device 204 contains phase information (described in greater detail below) from which the cosine and sine component generators, 208 and 210, determine corresponding cosine (I) and sine (Q) components. The component information is then provided to digital-to-analog (D/A) converters 212 and 214, respectively, for conversion of the component values into corresponding analog signals. The analog signals are modulated onto a carrier in modulator 216 (e.g., after first being upconverted to an intermediate frequency), whose output is provided to a radio processing part 218 for transmission.

In accordance with the exemplary DSP architecture described herein, the information generated by the summation device 204 is stored in a 32-bit register (not shown. Each 32-bit register sequence represents phase data sampled from the incoming source signal from which component values can be determined. However, due to limitations associated with, for example, a particular DSP architecture used, only a portion of the 32-bit sequence is ordinarily reliable. The reliable phase data contained within the 32-bit sequence, or a portion thereof, is used by the cosine and sine generators, 208 and 210, to address lookup tables (not shown in FIG. 2). The lookup tables contain sine (Q) and cosine (I) quadrature values addressable according to a given phase data value provided by phase data from the 32-bit sequence.

Some of the data within the 32-bit sequence (e.g., the least significant bits of the phase data sequence) is typically less reliable due to digital signal processing implications such as architecture constraints, rounding, truncation, and cancellation errors. In a given 32-bit sequence provided by the summation device 204, only 20 to 24 bits of the phase data can typically be relied on. However, even some of the least significant of these bits (i.e., bits 21-24) may not be as reliable as the most significant 20 bits. Full utilization of the 20 reliable bits would correspond to maintaining tables having $2^{20}$ or 1,048,576 entries (or 1M). Utilization of all of the 20 reliable bits in this manner would provide the best available resolution, but at a prohibitive cost in terms of memory. Another factor to consider with this solution is the DSP architecture involved. A conventional DSP architecture may not have the bus or register capability to manage 20-bit addresses without cumbersome addressing schemes. These schemes can have added costs in the form of additional instruction cycles required for their execution. A more practical solution is to disregard a portion of the reliable phase data in order to conserve DSP memory and avoid architecture implications. Even though a portion of the phase data is disregarded with this solution, a sufficient amount of resolution can still be maintained, for most applications, to provide sine and cosine components having an acceptable error factor.

In accordance with the first embodiment of the present invention, table sizes are selected to provide a sufficient amount of resolution without consuming an unacceptable amount of memory. Accordingly, the two main factors considered in selection of table sizes are resolution requirements and memory availability. The size of the tables can be selected according to other factors as well. These include, but are not limited to: DSP architecture considerations (e.g., bus and register sizes); the use of on and/or off-chip memory for storage of the tables; the speed of the on-and/or off-chip memory in which the tables are stored; and processor speed. While 32 bits are provided by the summation device 204, of which 20 bits are generally very reliable, DSP architecture considerations, such as bus widths, might not render all of these bits readily available for efficient use in accessing component information. In a DSP architecture having, for example, a 16-bit bus dedicated to the process, only 16 of the 20 reliable bits may be readily available for efficient component look up. Of course, a different DSP architecture may allow for more of the 20 bits of information to be used or may even provide more than 20 bits of reliable data.

Figure 3A:
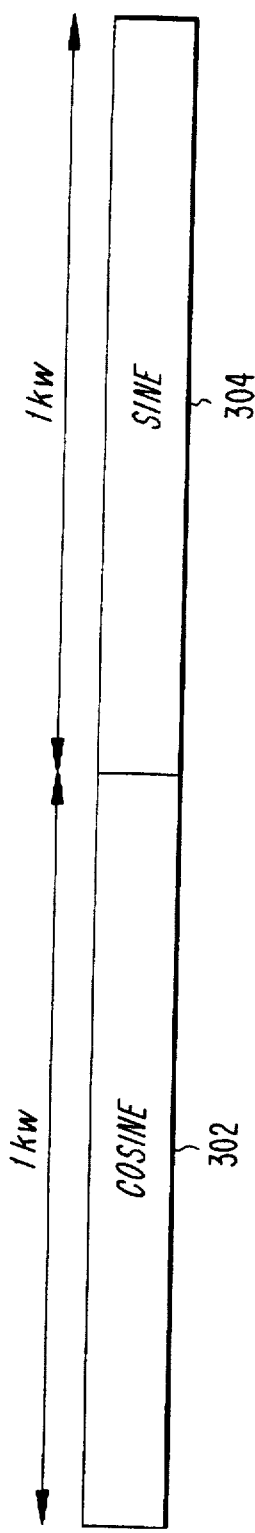
FIG. 3(a) is a diagram depicting a lookup table in accordance with a first exemplary embodiment of the invention.

In an exemplary embodiment, resolution may require, for example, 10-bits to provide sufficiently accurate component values. Accordingly, the 10 most reliable bits of the readily available 16 bits of phase data are used to access tables having $2^{10}$, or 1024 entries each. Two 1024 entry tables, one for cosine components and one for sine components, are stored in memory. Hence, for each quadrature component, there are 1024 increments spanning the possible values (e.g., 1024 incremental values between $-\pi$ and $\pi$). FIG. 3(a) pictorially illustrates cosine and sine tables 302 and 304 in accordance with this exemplary embodiment of the invention. It will be appreciated that the sine component information in the table in FIG. 3(a) can be addressed by adding 1024 to a cosine table entry address. In the exemplary embodiment described, the lookup tables are accessed using the 10 most reliable bits of phase data available from 32-bit sequence provided by the summation device 204. In view of the 10-bit resolution of the exemplary embodiment, the six least significant bits of the 16-bits of available phase data are stripped off by a DSP routine. Any additional phase information (reliable or otherwise) in the 32-bit samples is ignored.

It is readily apparent that greater resolution in the first embodiment requires use of a greater amount of phase data in the 32-bit sequence provided by summation device 204. For instance, if 14-bit resolution were desired, the 14 most reliable bits of the phase data could be used to access at least one table having $2^{14}$ or 16,384 entries. This would provide better resolution than using only 10 bits, however, at the expense of processor memory.

The embodiment described above discloses individual sine and cosine tables. Individual tables are provided to allow for the introduction calibration factors to compensate for gain and offset variations associated with analog components in radio sets. Hence, the component values in each table might be adjusted individually to compensate for these gain variations.

In the event that a radio set is manually calibrated (i.e., using adjustable components such as potentiometers, etc.) at the factory, or at an installation point, to adjust for variations, such variations need not be compensated for in the sine and cosine tables. In this situation, a single table can be used. Hence, in a manually adjusted radio set having, for example, a single cosine component table, a corresponding sine component value can simply be derived by subtracting 90° or π/2 from the cosine component value derived from the table.

In accordance with a second exemplary embodiment of the present invention, component values are derived using phase data that is separated into two parts. A first part is used to access one or more tables containing component information. A second part is used to calculate an offset value that is added to a component value derived from a table using the first part. The tables contain cosine and sine base component information and difference information that corresponds to differences between consecutive base component values. The difference information is used in conjunction with the second part of the phase data to calculate the offset value. The offset value is added to a base value to produce a component value for output. In this second exemplary embodiment of the invention, less memory is used, albeit at the expense of one or more instruction cycles that are used to calculate and add the offset value. However, some speed can be recovered because smaller tables are used which can be stored in high-speed memory.

Figure 3B:
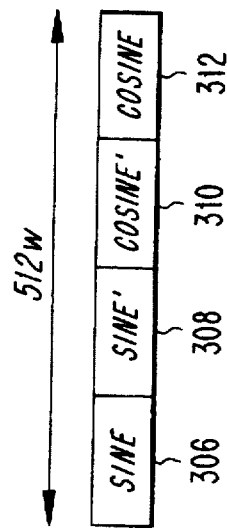
FIG. 3(b) is a lookup table organized in accordance with a second exemplary embodiment of the invention.

FIG. 3(b) illustrates an exemplary memory configuration for sine and cosine tables according to the second embodiment of the invention, the usage of which by cosine 208 and sine 210 generators will now be described below. Note that for the second exemplary embodiment described, the tables of FIG. 3(a) are four times the size of the tables of FIG. 3(b).

In an exemplary arrangement in accordance with the second embodiment of the invention, 16-bits of the available phase data from a 32-bit sequence (generated by the summation device 204) are used. The 16-bits are arranged in a two-part format wherein a first sequence of 7-bits is used to address the four tables 306, 308, 310 and 312. Accordingly, each table contains $2^7$, or 128 entries. A first table 306 and a second table 312 contain sine (Q) and cosine (I) base values, respectively. The third table 308 and a fourth table 310 contain the values of differences between consecutive base values in the first and second tables, respectively. To determine a Q component, the first part of the two-part phase data is used to address the sine 306 and sine' 308 tables. Similarly, to determine an I component, the first part of the phase data is used to address the cosine 312 and cosine' 310 tables.

A second part of the phase information, in accordance with the second exemplary embodiment, consists of a sequence of 9-bits (of the 16-bits of available phase data) which represent an offset factor. The offset factor is used in conjunction with a corresponding difference value (derived from a difference value table 308 and 310) to calculate an offset value. The offset value is then added to a (cosine or sine) base value (from tables 306 and 312) to determine the component value that is provided to a D/A converter. A component value (I or Q) is calculated in accordance with Equation 1:

$$\text{component} = A + \text{offset} \cdot (B - A) \quad (1)$$

wherein:

A is a base component value retrieved from a cosine or sine base component value table;

(B−A) is a difference between consecutive base values, A and B, retrieved from a cosine or sine difference value table; and offset is the offset factor from the second part of the phase data.

Figure 4:
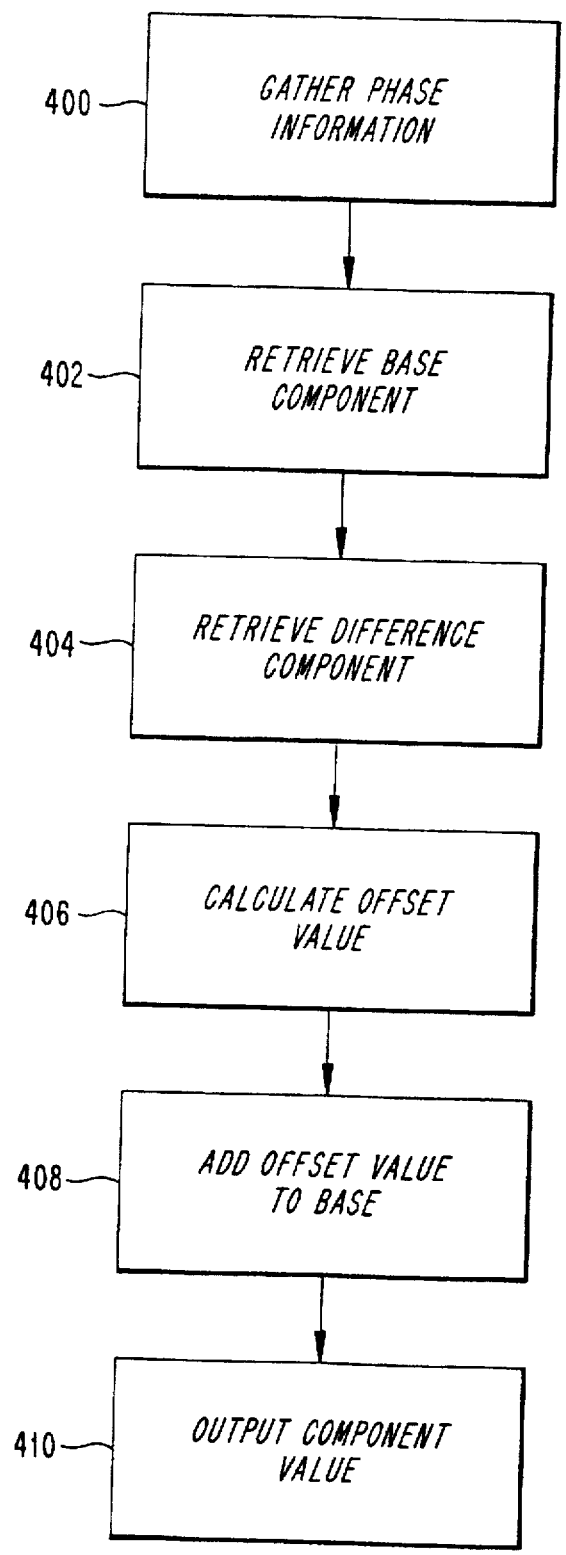
FIG. 4 is a flowchart illustrating a method in accordance with a second exemplary embodiment of the invention.

An example of determining a Q (sine) component, in accordance with the second embodiment of the invention set out above, is described with respect to the flow diagram depicted in FIG. 4. Phase data (in the form of a 16-bit sequence) contained in a 32-bit sequence produced by summation device 204 is derived at block 400. With respect to determining a sine component value, a first 7-bit part of the 16-bit sequence is used to address table 306 to retrieve a sine base component value (block 402). The first 7-bit part is further used to address table 308 to retrieve a difference value which is a difference between the sine base value retrieved at block 402 and a next consecutive sine base value in the first table (block 404). Accessing the corresponding difference value may be performed, for example, by adding 128 to an address pointer of the address used to access the sine base value table 306. Of course, the cosine difference component value can be accessed from table 310 by adding an additional 128 to the address pointer.

The difference value derived from table 308 is used in conjunction with an offset factor provided by the second 9-bit part (of the 16-bit sequence) to produce an offset value. In a preferred embodiment, calculation of the offset value is performed (at block 406) by multiplying the offset factor with the sine difference value retrieved from table 308. The offset value is then added to the sine base value retrieved at block 402 to determine the sine (Q) component (block 408) that is provided for output (block 410). A similar procedure can be performed to determine the cosine component values, albeit using the appropriate cosine tables 310 and 312.

The four tables 306, 308, 310 and 312, arranged in accordance with this exemplary embodiment of the invention, each contain 128 entries. However, those skilled in the art will readily appreciate that table size is discretionary depending on particular performance requirements and system capabilities. In accordance with a preferred embodiment, the tables are organized in a consecutive memory address arrangement in a DSP memory. The sine base value table 306 is followed by the sine difference value table (sine') 308, which sine difference values are followed by cosine difference values (cosine') 310, which cosine difference values 410 are followed by cosine base values 312. Arranging the tables in this way takes advantage of the particular DSP architecture characteristics associated with the exemplary embodiments described herein. In particular, this arrangement of the tables described takes advantage of DSP architecture characteristics of the Texas Instruments TMS320c5x family of processors, which processors can be used in practicing the invention. However, the particular arrangement described is discretionary, and other processor architectures may call for different table arrangements to achieve a desired result.

Figure 5A:
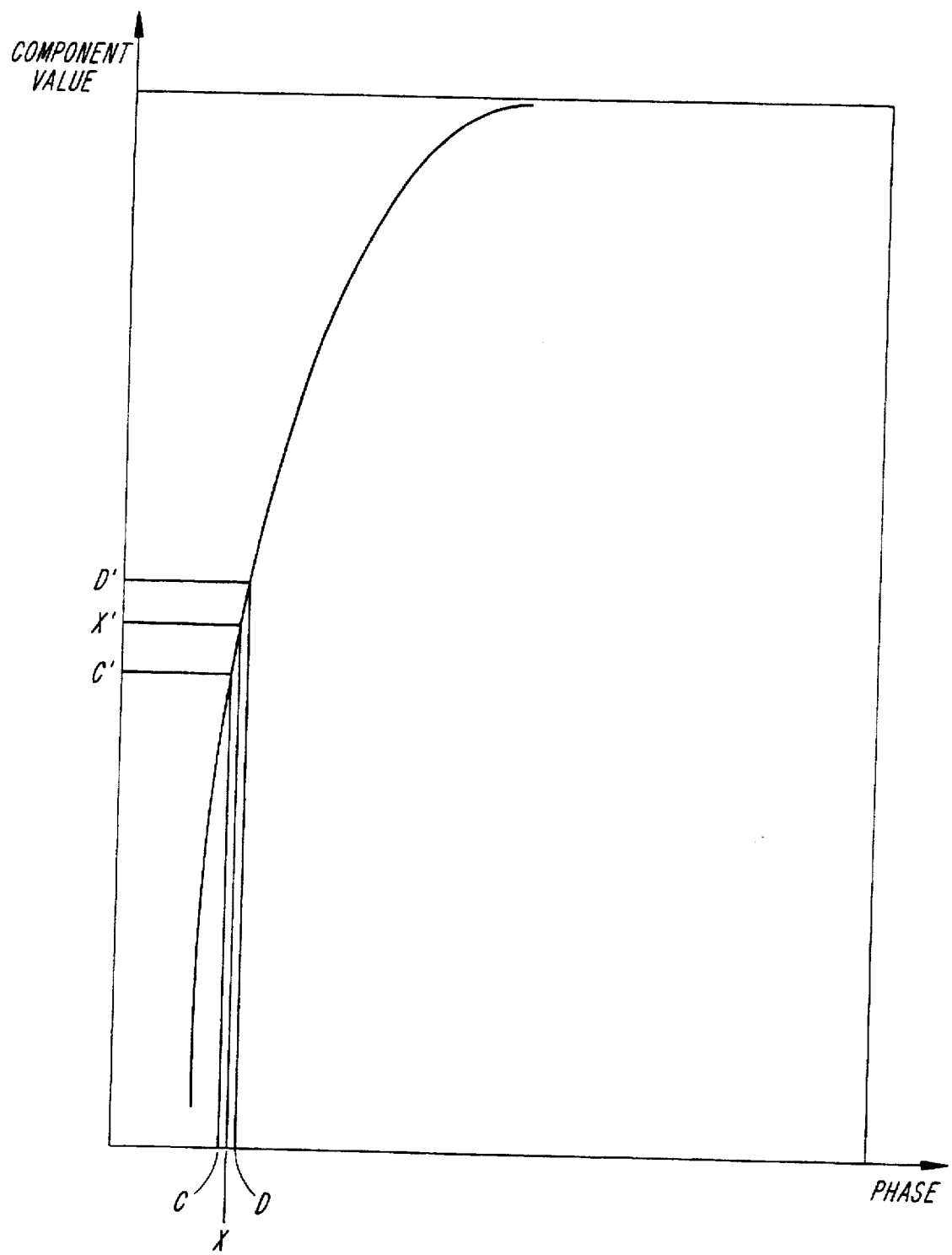
FIGS. 5(a) and 5(b) are graphs illustrating operation with first and second exemplary embodiments of the invention, respectively.
Figure 5B:
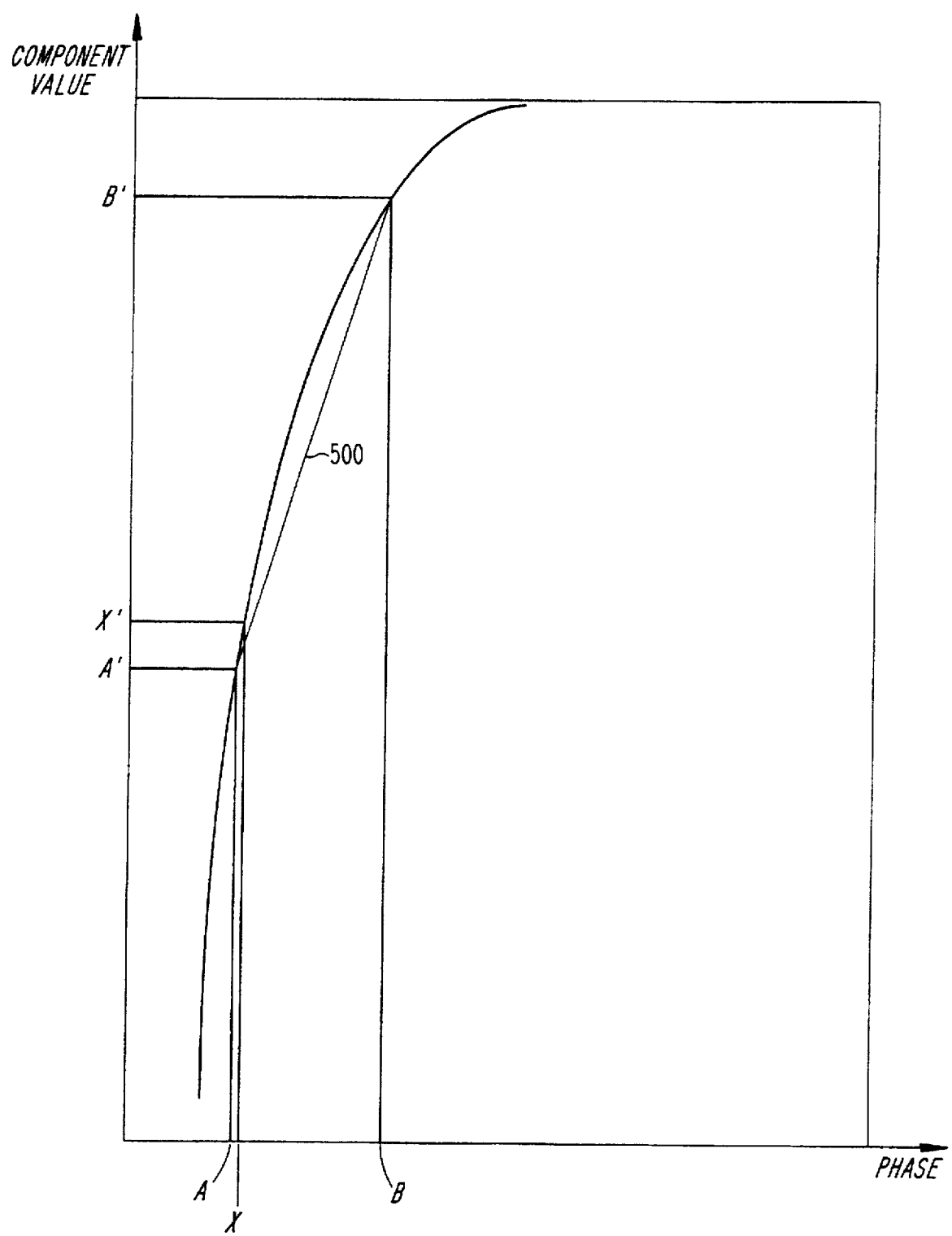

Some advantages of utilizing arrangements, or operating with methods in accordance with the invention are illustrated in FIGS. 5(a) and 5(b). The graphs provided in these figures are not to scale. Because the number of incrementations for the entire range of phase component values is limited by the amount of DSP memory reasonably available, an actual phase value may fall between consecutive incremental values stored in a conventional sine or cosine look-up table. FIG. 5(a) is a graph depicting generation of a component value using a system in accordance with the first embodiment of the invention described above. In the graph, points C and D on the phase (horizontal) axis represent incremental phase values corresponding to a 10-bit phase sequence from the 32-bit sequence. The actual phase value is shown at point X. Corresponding table values for points C and D from the 1024-entry table of FIG. 3(a) are shown on the vertical axis at positions C' and D'. The corresponding phase component value for the actual value (not stored in the table of FIG. 3(a)) is shown at X'. In operation, the conventional arrangement produces the value corresponding to C' when the phase value X is received by a cosine (I) or sine (Q) component generator. Consequently, an error amount, which is the difference between the values of C' and X', exists. This error amount is reduced by providing higher resolution. Higher resolution usually involves using a larger amount of phase data to access correspondingly larger tables.

FIG. 5(b) is a graph depicting generation of a component value in an arrangement incorporating the second exemplary embodiment of the invention described above. In the graph, points A and B on the horizontal axis represent possible phase values from the first 7-bit sequence of the 16-bit phase data sequence. The actual phase value is shown at point X. It is readily apparent that the system incorporating the first embodiment provides approximately eight stored incremental values for every one base value increment stored according to the second embodiment (i.e., $2^{10}$ versus $2^7$). Corresponding table values for A and B, retrieved from one of the 128-entry base value tables 306 and 312, are shown on the vertical axis at points A' and B'. The actual corresponding phase component value is shown at X'. In operation, the arrangement produces a component value in accordance with Equation 1. That is, an offset value calculated by multiplying an offset factor with the difference between A' and B' (which difference is retrieved from a difference value table) is added to the base value corresponding to A' (retrieved from a base value table). The offset value can be illustrated by a line 500 in FIG. 5(b). The line 500 corresponds to possible offset values. The line 500 is comprised of a number of data points corresponding to the offset value. Hence, for the exemplary 9-bit offset factor described above, the line 500 consists of $2^9$ or 512 possible offset values. It should be noted that FIG. 5(b) (and FIG. 5(a)) is not to scale and only provided to illustrate operation in accordance with the exemplary embodiments described herein. For instance, the line 500 ordinarily conforms very closely to the phase curve between consecutive base component values. By adding the offset value to the base component value A', the component value produced can be nearer to the actual value of X' than the value provided by systems according to the first embodiment (e.g., C' in FIG. 5(a)). This can be readily appreciated by considering the case where A' and C' happen to be the same value. In such a case, the system incorporating the first embodiment produces a component value of C', while a system incorporating the second exemplary embodiment of the invention produces a component value corresponding to A' plus an offset value.

Apparatuses and methods incorporating the invention utilize readily available phase data produced by a sampling arrangement. It will be appreciated by one skilled in the art that determining a phase component using a greater number of bits of information generally provides greater resolution. In the second described exemplary embodiment, a greater amount of phase information is used to derive I and Q components by breaking up the available phase information. Additional information used in the second exemplary embodiment might otherwise be disregarded in the first exemplary embodiment (because of memory constraints). The cost of the additional resolution provided by the second exemplary embodiment is in additional instructions cycles required for offset value calculation and addition. However, systems operating in accordance with the second exemplary embodiment can use smaller tables, thereby conserving memory. Because the tables can be relatively small, they can be stored in high-speed memory (e.g., SRAM) which provides time savings compared to the memory types typically used to store the (larger) tables associated with the first exemplary embodiment.

The expense of possible additional table access and additional calculation involved in systems incorporating the second exemplary embodiment also is offset by the increased accuracy provided for a given amount of memory used. This enhanced accuracy reduces the amount of component error. For example, in systems according to the first exemplary embodiment described above (i.e., 10-bit resolution), table derived component values were found to have a maximum phase component deviation, that is difference from an actual phase component value (e.g., C' versus X'), in the vicinity of 0.3%. In systems operating in accordance with the second exemplary embodiment of the invention (i.e., 7-bit table address, 9-bit offset factor), a maximum error was found to be approximately 0.04%.

Figure 6A:
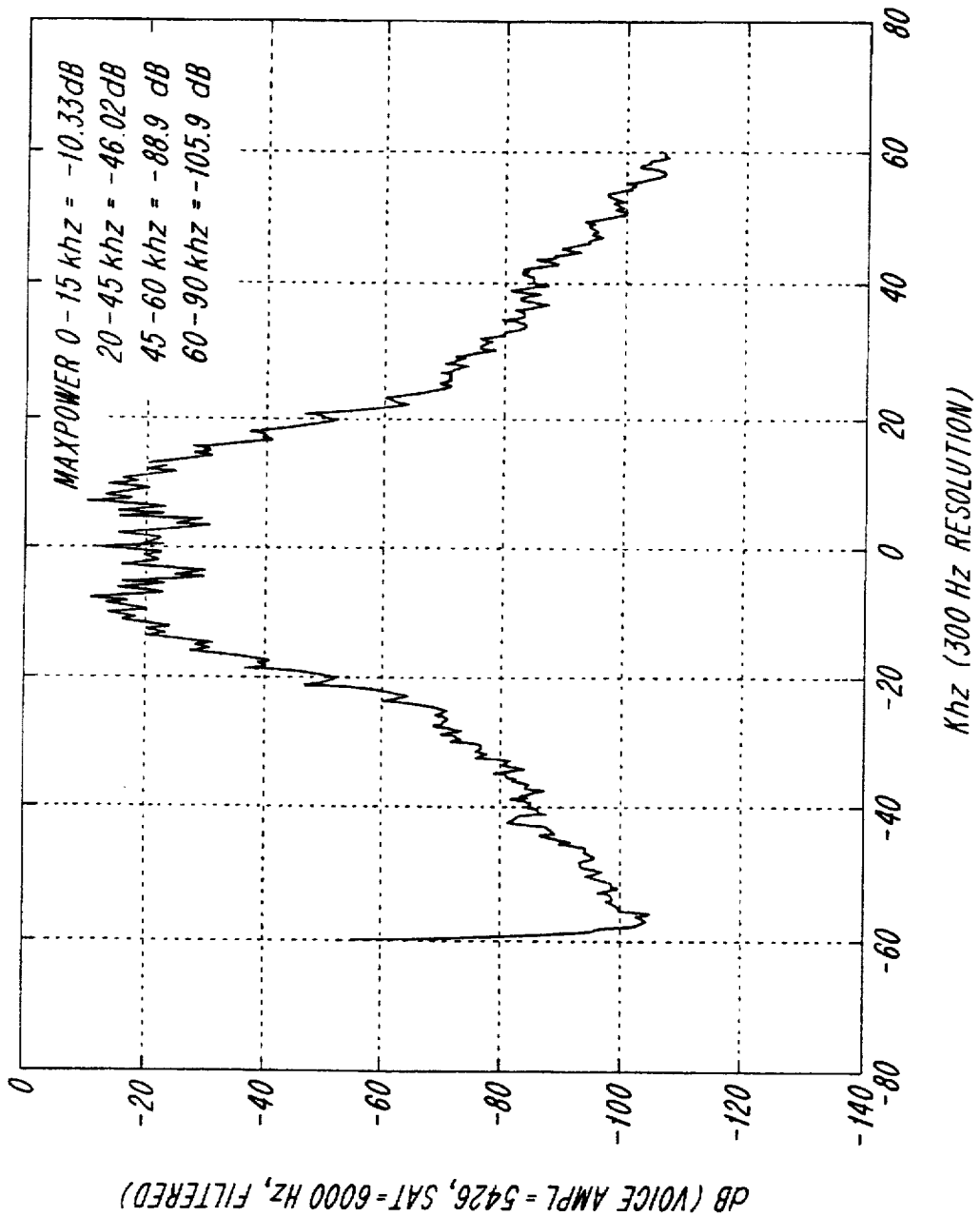
FIGS. 6(a) and 6(b) are graphs illustrating relative power spectrums associated with output from first and second exemplary embodiments of the inventive system, respectively.
Figure 6B:
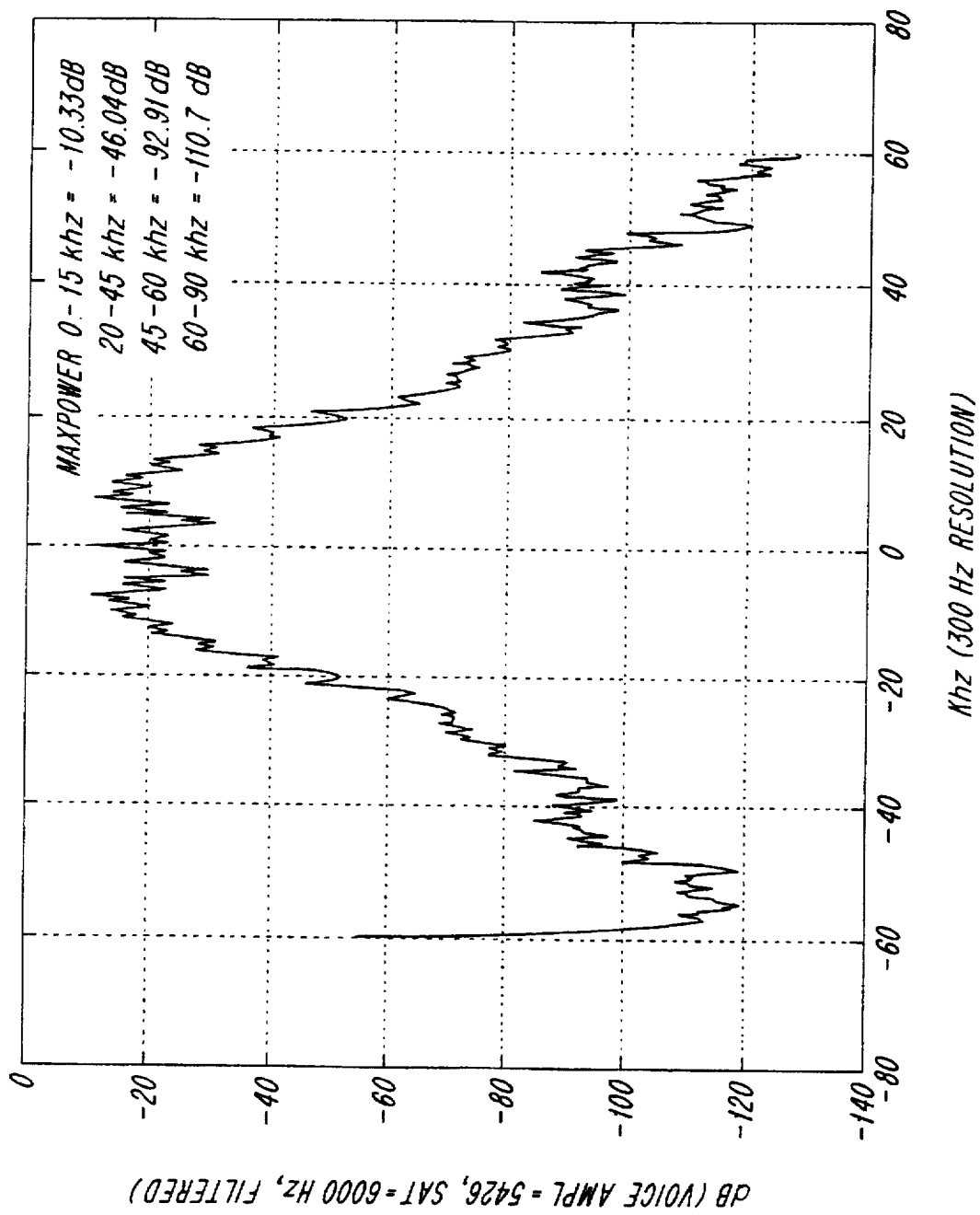

The advantages provided by systems incorporating the invention can be illustrated by comparing the output transmission waveforms illustrated in FIGS. 6(a) and 6(b). FIG. 6(a) depicts a relative power spectrum of a filtered modulated carrier signal in accordance with the exemplary arrangement described for the first embodiment of the invention, while FIG. 6(b) depicts a relative power spectrum of the same modulated carrier signal in a system in accordance with the described exemplary arrangement in accordance with the second exemplary embodiment. By comparing these graphs, it is readily apparent that signal power in the sideband portions (i.e., ±30 kHz) of the spectrum is diminished in the scenario depicting utilization of the system incorporating the exemplary second embodiment of the invention. Reduced power emission in the sideband is desirable to reduce, among other things, adjacent channel interference. This interference is due, in part, to phase deviation (errors) in the values provided by the cosine and sine (I and Q) component generators 208 and 210. Of course, reduced sideband power emissions can be achieved in systems according to the first exemplary embodiment by increasing signal resolution.

The invention has been described with reference to particular exemplary embodiments. However, it will be readily apparent to those skilled in the art that it is possible to embody the invention in specific forms other than those of the preferred embodiments described above. Exemplary utilization of the invention described herein discloses application in a particular DSP architecture. However, it also is possible to embody the invention in a programmed application carried out by use of a general purpose processor, an ASIC, or by discrete processing components. Embodiment of the invention in such a way may be done without departing from the spirit of the invention.

The table arrangements also have been described with reference to particular exemplary embodiments. However, it will be readily apparent to those skilled in the art that it is possible to organize and store one or more tables in a variety of ways. For example, in the second embodiment, a single component table can be used whose entries contain both base and difference values. Moreover, the two-part phase data format can be organized in a variety of ways to achieve a desired result. For example, if processor architecture characteristics permit, a greater number of phase data bits can be dedicated to the table address or to the offset factor. The 32-bit phase data sequence provided by a Texas Instruments TMS320c5x DSP can readily provide 20-bits of reliable phase data. Therefore, an alternate two-part phase data arrangement may comprise a 7-bit address and a 13-bit offset factor. In addition, an input signal 200 may already be in a digital format whereby phase data can be derived directly for purposes of accessing one, or more component tables, or for calculation of an offset value.

Therefore, the embodiments described herein are merely illustrative and should not be considered restrictive in any way. The scope of the invention is given by the appended claims, rather than by the preceding description, and all variations and equivalents which fall within the range of the claims are intended to be embraced therein.

What is claimed is:

1. A method for determining a quadrature component of a signal, the method comprising the steps of:
   providing a first lookup table containing quadrature component base values arranged in consecutive value order;
   providing a second lookup table containing differences between consecutive base component values in the first table;
   determining phase angle data of the signal;
   separating the phase angle data into a table address and an offset factor;
   accessing the first lookup table using the table address to determine a base component value;
   accessing the second lookup table using the table address to determine a corresponding difference value;
   calculating an offset value using the offset factor in combination with the difference value; and
   adding the offset value to the base component value to determine the quadrature component of the signal.

2. The method claimed in claim 1, wherein the method is carried out in a digital signal processing routine.

3. The method claimed in claim 1, further comprising the step of:
   receiving an analog signal.

4. The method claimed in claim 3, further comprising the step of:
   sampling the analog signal and converting it into a digital format.

5. The method claimed in claim 4, further comprising the step of:
   upsampling the digitized signal and accumulating the results.

6. The method of claim 5, wherein phase angle data is derived from the results of the upsampling step.

7. The method of claim 1, wherein the step of calculating an offset value is the product of the offset factor and the difference.

8. The method of claim 1 further comprising the steps of:
   providing the quadrature component of a modulator.

9. A method for determining a quadrature component in a signal, the method comprising the steps of:
   ascertaining phase angle data of the signal;
   using the phase angle data to access a memory to determine a quadrature component base value and a difference value, which difference value is a difference between the quadrature component base value and a next incremental component base value stored in said memory;
   calculating an offset value by multiplying the difference value with an offset factor contained in the phase angle data; and
   adding the offset value to the quadrature base component value to provide the quadrature component in the signal.

10. A method for determining a quadrature component of a signal, the method comprising the steps of:
    receiving a signal which includes phase data;
    using a first part of the phase data to access a first lookup table to determine a base value of a quadrature component;
    accessing a second lookup table to determine a difference value which is a difference between the base determined from the first lookup table and a next base component value in the first lookup table;
    using a second part of the phase data as an offset factor to determine an offset value, which offset value is a product of the difference value and the offset factor; and
    determining the quadrature component by adding the offset value to the base value.

11. A method of determining a quadrature value of a source signal, the method comprising the steps of:
    determining phase data associated with the source signal;
    accessing lookup tables based on the phase data to determine a quadrature base component value, and to determine a value of a difference between the quadrature base value determined and a next quadrature base component value;
    calculating an offset value based on a product of an offset factor contained in the phase data and the difference values; and
    adding the offset value to the quadrature base value determined to determine the quadrature component value.

12. The method as claimed in claim 11, further comprising the steps of:
    sampling the signal;
    upsampling sampling output and accumulating the results; and
    extracting phase data from the accumulated results.

13. The method as claimed in claim 11, further comprising the steps of:
    converting the quadrature component value into an analog format; and
    modulating the component value.

14. An apparatus for determining a quadrature component contained in a signal, the apparatus comprising:
    means for determining phase data associated with the signal;
    memory for storing base component values and for storing difference values between consecutive base component values;
    means for accessing the memory means, using a first part of the phase data as an address, to determine a base value and a difference value associated with the phase data;
    means for determining an offset value, which offset value is a product of a second part of the phase data and the difference value;
    means for adding an offset value to a base value to produce a quadrature component.

15. The apparatus of claim 14, wherein the means for determining the phase data comprises:
    means for sampling the signal; and
    means for upsampling and accumulating samples from the sampling means to generated accumulated output from which signal phase data can be determined.

16. An apparatus for determining a quadrature component of a digital signal, the apparatus comprising:

means for receiving a signal;

means for using the phase data in the signal sample to access a first lookup table to determine a base value of the quadrature component;

means for using the phase data in the signal to access a second lookup table to determine a difference value, which difference value corresponds to a difference between the quadrature component base value determined from the first lookup table and a next quadrature base component value in the first lookup table;

means for calculating an offset value based on the quadrature difference value and an offset factor contained in the phase data; and means for adding the offset value to the base value.

* * * * *